US012573778B2

(12) United States Patent
Kawada et al.

(10) Patent No.: US 12,573,778 B2
(45) Date of Patent: Mar. 10, 2026

(54) METAL MATERIAL, CONNECTION TERMINAL AND METAL MATERIAL MANUFACTURING METHOD

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Daisuke Kawada, Mie (JP); Kingo Furukawa, Mie (JP); Hajime Watanabe, Mie (JP); Michitake Kamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 298 days.

(21) Appl. No.: 18/275,996

(22) PCT Filed: Feb. 17, 2022

(86) PCT No.: PCT/JP2022/006428
§ 371 (c)(1),
(2) Date: Aug. 4, 2023

(87) PCT Pub. No.: WO2022/181445
PCT Pub. Date: Sep. 1, 2022

(65) Prior Publication Data

US 2024/0120673 A1 Apr. 11, 2024

(30) Foreign Application Priority Data

Feb. 24, 2021 (JP) ................................ 2021-026921

(51) Int. Cl.
*H01R 13/03* (2006.01)
*C22C 28/00* (2006.01)
(Continued)

(52) U.S. Cl.
CPC ............. *H01R 13/03* (2013.01); *C22C 28/00* (2013.01); *C25D 5/12* (2013.01); *H01R 43/16* (2013.01)

(58) Field of Classification Search
CPC ........ H01R 13/03; H01R 43/16; C22C 28/00; C22C 19/03; C25D 5/12; C25D 3/12; C25D 7/00
(Continued)

(56) References Cited

U.S. PATENT DOCUMENTS

| | | | | |
|---|---|---|---|---|
| 10,530,084 | B2 * | 1/2020 | Shibuya | H01R 13/03 |
| 10,804,632 | B2 * | 10/2020 | Watanabe | C23F 1/00 |
| 2003/0091855 | A1 | 5/2003 | Tanaka et al. | |
| 2003/0186597 | A1 * | 10/2003 | Suzuki | H01R 13/03 439/886 |

(Continued)

FOREIGN PATENT DOCUMENTS

| | | | | |
|---|---|---|---|---|
| CN | 105603475 A | | 5/2016 | |
| EP | 3421643 A1 | * | 1/2019 | C22C 13/00 |

(Continued)

OTHER PUBLICATIONS

International Search Report issued on Apr. 26, 2022 for WO 2022/181445 A1 (4 pages).

*Primary Examiner* — Peter G Leigh
(74) *Attorney, Agent, or Firm* — Venjuris, P.C.

(57) ABSTRACT

A metal material 1 is provided with a base material 2, an intermediate layer 3 containing at least Ni and covering a surface of the base material 2, and an In covering layer 4 made of In or In alloy not containing Ni other than as unavoidable impurities, covering a surface of the intermediate layer 3 and exposed on an outermost surface. In is contained more than 7/3 times of Ni in an atomic ratio in the (Continued)

sum of the intermediate layer and the In covering layer. Further, a connection terminal is configured to contain the metal material 1, and the intermediate layer 3 and the In covering layer 4 are formed on the surface of the base material 1 at least in a contact point portion to be brought into electrical contact with a mating electrically conductive member.

10 Claims, 3 Drawing Sheets

(51) Int. Cl.
*C25D 5/12* (2006.01)
*H01R 43/16* (2006.01)

(58) Field of Classification Search
USPC .......................................................... 439/886
See application file for complete search history.

(56) References Cited

U.S. PATENT DOCUMENTS

| | | | | |
|---|---|---|---|---|
| 2009/0053553 | A1* | 2/2009 | Masago | B32B 15/01 428/647 |
| 2020/0036125 | A1* | 1/2020 | Watanabe | C25D 5/10 |
| 2020/0243995 | A1 | 7/2020 | Kodama et al. | |

FOREIGN PATENT DOCUMENTS

| | | | | | |
|---|---|---|---|---|---|
| JP | 2006219736 | A | * | 8/2006 | |
| JP | 2012028139 | A | * | 2/2012 | |
| JP | 2014-035873 | A | | 2/2014 | |
| JP | 2015-203139 | A | | 11/2015 | |
| JP | 2020200536 | A | * | 12/2020 | H01R 12/58 |
| KR | 20170121436 | A | * | 11/2017 | C23C 28/023 |
| WO | WO-2013153832 | A1 | * | 10/2013 | C22C 5/02 |
| WO | WO-2014045704 | A1 | * | 3/2014 | C25D 7/00 |
| WO | WO-2017038048 | A1 | * | 3/2017 | C25D 5/12 |
| WO | WO-2020189689 | A1 | * | 9/2020 | C25D 7/06 |

* cited by examiner

METAL MATERIAL, CONNECTION TERMINAL AND METAL MATERIAL MANUFACTURING METHOD

CROSS REFERENCE TO RELATED APPLICATIONS

This application is a national phase of PCT application No. PCT/JP2022/006428, filed on 17 Feb. 2022, which claims priority from Japanese patent application No. 2021-026921, filed on 24 Feb. 2021, all of which are incorporated herein by reference.

TECHNICAL FIELD

The present disclosure relates to a metal material, a connection terminal and a metal material manufacturing method.

BACKGROUND

In an electrical connection member such as a connection terminal, an In or In alloy layer may be provided on a surface of a base material made of Cu, Cu alloy or the like. In is a metal very soft and exhibiting solid lubricity. Thus, by providing a metal layer containing In on a surface of a connection terminal, a friction coefficient of the surface can be reduced and a force (insertion force) required to insert and fit the connection terminal can be reduced.

For example, Patent Document 1 discloses a terminal pair, which is composed of a male connector terminal and a female connector terminal respectively having indium layers on outermost surfaces of contact point portions to be electrically brought into contact with each other and for which a load to be applied to the contact point portions is set to a predetermined value. Here, it is also disclosed to provide an intermediate layer made of nickel between the indium layer and a surface of a base material such as copper or copper alloy and suppress the diffusion of copper atoms from the base material to the indium layer. Preferably, a thickness of the indium layer is in a range of 0.5 to 3 μm and a thickness of the Ni layer is in a range equal to or more than 2 μm.

Patent Document 2 discloses a connection terminal in which a surface plating layer made of In or alloy mainly containing In is provided on a surface of a base material made of Cu or Cu alloy and a hard playing layer harder than the surface plating layer is formed below the surface plating layer. The hard plating layer is made of an intermetallic compound of Cu and In or an intermetallic compound further containing elements such as Ni in addition to Cu and In. Further, it is also described that a base plating layer made of Ni or Ni alloy is provided below the hard plating layer. Preferably, a thickness of the surface plating layer is in a range of 0.45 to 10 μm, that of the hard plating layer is in a range of 0.05 to 10 μm and that of the base plating layer is in a range of 0.05 to 10 μm.

PRIOR ART DOCUMENT

Patent Document

Patent Document 1: JP 2014-035873 A
Patent Document 2: JP 2012-028139 A

SUMMARY OF THE INVENTION

Problems to be Solved

In recent years, a connection terminal has been required more than before to reduce an insertion force. For example, in the field of automotive connection terminals, the multi-polarization of connectors, i.e. an increase in the number of connection terminals included in one connector, proceeds with the electrification and high performance of automotive vehicles, and a reduction in the insertion force of each connection terminal is required at a higher level than before in terms of reducing an insertion force of an entire connector by reducing the insertion force of each connection terminal constituting the connector. On the other hand, connection terminals capable of being used under strict use conditions, which lead to a high-temperature environment, are required.

If the connection terminal is formed using a metal material having an In layer on a surface as disclosed in Patent Document 1 and 2, the insertion force can be reduced due to the solid lubricity of In. Further, since In shows a low contact resistance on the surface, the connection terminal having the In layer on the surface is excellent also in connection reliability. However, even if the connection terminal having the In layer on the surface is used in a high-temperature environment, inherent characteristics of In such as a low insertion force and high connection reliability are not necessarily stably maintained. For example, if alloying occurs between In contained in the In layer and the metal of the base material or lower layer, there is a possibility that inherent characteristics of In are damaged. Also in Patent Document 1 and 2 disclosing the connection terminal having the In layer on the surface, it is not mentioned that the connection terminal is placed under a high-temperature environment, and it is not clear from these Document whether or not the characteristics by the In layer are sufficiently exhibited after the high-temperature environment.

Accordingly, it is aimed to provide a metal material and a connection terminal capable of exhibiting characteristics of In on a surface even after a high-temperature environment and a method for manufacturing such a metal material.

Means to Solve the Problem

A metal material of the present disclosure includes a base material, an intermediate layer containing at least Ni, the intermediate layer covering a surface of the base material, and an In covering layer made of In or In alloy not containing Ni other than as unavoidable impurities, the In covering layer covering a surface of the intermediate layer and being exposed on an outermost surface, In being contained more than 7/3 times of Ni in an atomic ratio in the sum of the intermediate layer and the In covering layer.

A connection terminal of the present disclosure is configured to contain the metal material, and the intermediate layer and the In covering layer are formed on the surface of the base material at least in a contact point portion to be brought into electrical contact with a mating electrically conductive member.

A metal material manufacturing method of the present disclosure includes forming a Ni raw material layer made of Ni or Ni alloy not containing In other than as unavoidable impurities on a surface of a base material, and forming an In raw material layer made of In or In alloy not containing Ni other than as unavoidable impurities to cover a surface of the Ni covering layer, the In raw material layer being exposed on an outermost surface, a thickness of the In raw material layer being 5.6 times or more of that of the Ni raw material layer.

Effect of the Invention

The metal material and the connection terminal according to the present disclosure are a metal material and a connection terminal capable of exhibiting characteristics of In on a surface even after a high-temperature environment. Further, the metal material manufacturing method according to the present disclosure, such a metal material can be manufactured.

DETAILED DESCRIPTION TO EXECUTE THE INVENTION

Description of Embodiments of Disclosure

Figure 1A:
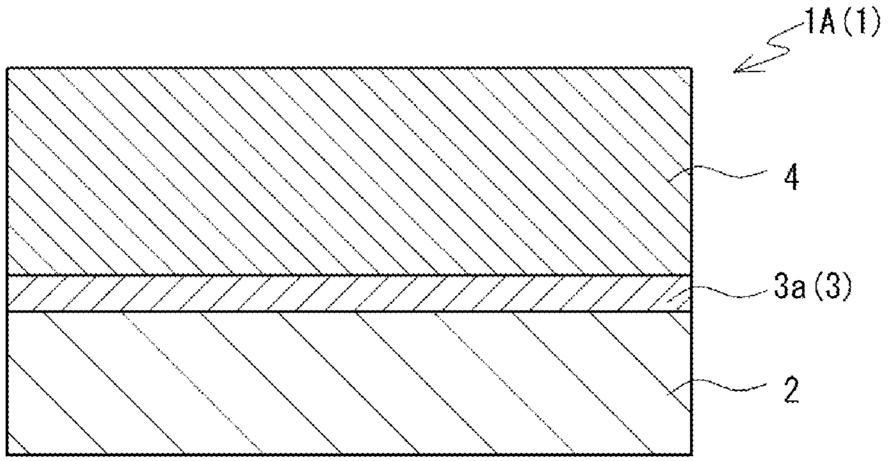
FIGS. 1A, 1B and 1C are diagrams showing cross-sections of metal materials according to a first form, a second form and a third form of the present disclosure.

First, embodiments of the present disclosure are listed and described.

The metal material of the present disclosure includes a base material, an intermediate layer containing at least Ni, the intermediate layer covering a surface of the base material, and an In covering layer made of In or In alloy not containing Ni other than as unavoidable impurities, the In covering layer covering a surface of the intermediate layer and being exposed on an outermost surface, In being contained more than 7/3 times of Ni in an atomic ratio in the sum of the intermediate layer and the In covering layer.

In the above metal material, since the In covering layer is exposed on the outermost surface, characteristics of In such as a reduction in friction coefficient and a reduction in contact resistance can be utilized on the surface. The intermediate layer contains Ni, which is a metal easily forming an alloy with In when temperature gets high, but In is contained more than 7.3 times of Ni in the atomic ratio in the sum of the intermediate layer and the In covering layer. In and Ni easily form an intermetallic compound having a composition of $Ni_3In_7$, but the In covering layer containing In not forming an alloy with Ni remains on the surface of the metal material even if temperature gets high and the alloying of In and Ni proceeds since more In than a composition ratio of this intermetallic compound is contained in a region of the sum of the intermediate layer and the In covering layer. Since the In covering layer remains on the surface even after a high-temperature environment, a state where the characteristics of In are exhibited is maintained on the surface and the metal material is high in heat resistance.

Here, if the Ni covering layer is a layer made of Ni or Ni alloy not containing In other than as unavoidable impurities and the alloy layer is a layer made of alloy containing Ni and In, the intermediate layer may have any one of following first structure, second structure and third structure. In the first structure, the intermediate layer is composed of the Ni covering layer. In the second structure, the intermediate layer is composed of the Ni covering layer and the alloy layer covering the surface of the Ni covering layer. In the third structure, the intermediate layer is composed of the alloy layer. If the metal material including the intermediate layer of the first structure is left in a high-temperature environment, the alloying of Ni and In proceeds and a metal material having the intermediate layer of the second or third structure is formed. However, since In is contained more than 7/3 times of Ni in the atomic ratio in the sum of the intermediate layer and the In covering layer in any stage where the intermediate layer has any one of the three types of structures, the In covering layer containing In not forming an alloy with Ni remains on the surface of the metal material in that state and a state reached by further alloying.

In this case, the intermediate layer may have the first structure or the second structure, and a thickness of the In covering layer may be 5.6 times or more of that of the Ni covering layer. This thickness ratio of the In covering layer and the Ni covering layer corresponds to a state where In is more than 7/3 times of Ni in the atomic ratio of In and Ni. Thus, even if the metal material is placed in a high-temperature environment and the alloying proceeds between In constituting the In covering layer and Ni constituting the Ni covering layer to form $Ni_3In_7$, the In covering layer containing In not forming an alloy with Ni can remain on the outermost surface of the metal material.

Further, the intermediate layer may have the first structure or the second structure, and the thickness of the Ni covering layer may be 1 μm or less. If the Ni covering layer has a thickness of about 1 μm, the diffusion of metal atoms from the base material can be sufficiently suppressed. The thickness of the Ni covering layer is preferably 0.5 μm or more if possible. If the thickness of the In covering layer is set to 6 μm or more when the thickness of the Ni covering layer is 1 μm, In is more than 7/3 times of Ni in the atomic ratio of In and Ni. Thus, without forming the covering layers excessively thick, the In covering layer containing In not forming an alloy with Ni can remain with a thickness capable of sufficiently exhibiting the characteristics of In on the outermost surface of the metal material when the metal material is placed in a high-temperature environment.

In these cases, the intermediate layer may have the first structure. In the first structure, the intermediate layer is composed only of the Ni covering layer, and the In covering layer is formed to directly cover the surface of the Ni covering layer. Thus, In constituting the In covering layer particularly easily forms an alloy with Ni constituting the Ni covering layer, but the In covering layer containing In not alloyed with Ni can remain on the outermost surface even if the metal material is placed in a high-temperature environment since the In covering layer has a thickness sufficiently larger than that of the Ni covering layer.

Alternatively, the intermediate layer may have the second structure or the third structure, and the alloy layer may contain an intermetallic compound of $Ni_3In_7$. By forming the intermediate layer containing $Ni_3In_7$ below the In covering layer, a high effect of reducing a friction coefficient is obtained on the surface of the In covering layer. $Ni_3In_7$ is an intermetallic compound easily formed as an alloy of Ni and In, and has a high content ratio of In. Since a sufficient number of In atoms as compared to Ni atoms are contained in a combined region of the intermediate layer and the In covering layer as described above, a state where the In covering layer containing In not alloyed with Ni is exposed on the outermost surface of the metal material is maintained even after the alloy layer containing $Ni_3In_7$ is formed.

A content of Ni per unit area of the intermediate layer and the In covering layer together may be 0.89 mg/$cm^2$ or less, and a content of In per unit area of the intermediate layer and the In covering layer together may be 4.3 mg/$cm^2$ or more. These contents of In and Ni correspond to a state where In is more than 7/3 times of Ni in the atomic ratio.

The base material may be made of Cu or Cu alloy. Since Cu and Cu alloys have high processability, mechanical characteristics and the like, these are generally used as a base material of an electrical connection member such as a connection terminal. By providing an In covering layer exposed on an outermost surface, these can be suitably used as a constituent material of the electrical connection member. By providing a Ni covering layer and/or an alloy layer containing Ni and In as the intermediate layer below the In covering layer, the diffusion of Cu atoms of the base material to the In covering layer can be suppressed.

The connection terminal according to the present disclosure is configured to contain the metal material, and the intermediate layer and the In covering layer are formed on the surface of the base material at least in a contact point portion to be brought into electrical contact with a mating electrically conductive member.

In the above connection terminal, the intermediate layer and the In covering layer are formed on the surface of the contact point portion and In is contained more than 7/3 times of Ni in the atomic ratio in the sum of the intermediate layer and the In covering layer. Thus, characteristics of In such as a low friction coefficient and a low contact resistance can be utilized on the surface of the contact point portion, and the connection terminal can be excellent in terms of a low insertion force and high connection reliability. Further, since the In covering layer containing In not alloyed with Ni remains on the surface of the contact point portion even after a high-temperature environment, those characteristics exhibited by In can be stably maintained and the connection terminal is excellent in heat resistance.

A metal material manufacturing method according to the present disclosure includes forming a Ni raw material layer made of Ni or Ni alloy not containing In other than as unavoidable impurities on a surface of a base material, and forming an In raw material layer made of In or In alloy not containing Ni other than as unavoidable impurities to cover a surface of the Ni covering layer, the In raw material layer being exposed on an outermost surface, a thickness of the In raw material layer being 5.6 times or more of that of the Ni raw material layer.

In the above metal material manufacturing method, the thickness of the In raw material layer formed on the surface of the Ni raw material layer is 5.6 times or more of that of the Ni raw material layer. This thickness ratio means that In contained in the In covering layer is more than 7/3 times of Ni contained in the Ni raw material layer in the atomic ratio. Ni and In are metals which easily form alloys when being heated, and form an intermetallic compound of $Ni_3In_7$. However, since the In raw material layer is formed to have the above thickness ratio with respect to the Ni raw material layer, even if the metal material, in which the Ni raw material layer and the In raw material layer are laminated, is placed in a high-temperature environment, the In covering layer containing In not alloyed with Ni remains on the outermost surface of the metal material. As a result, even after the high-temperature environment, the characteristics of In can be exhibited on the surface.

Here, the thickness of the Ni raw material layer may be 1 μm or less. If the thickness of the Ni raw material layer is about 1 μm, the diffusion of metal atoms from the base material can be sufficiently suppressed. The thickness of the Ni raw material layer is preferably 0.5 μm or more if possible. If the thickness of the In raw material layer is set to 6 μm or more when the thickness of the Ni raw material layer is 1 μm, In is more than 7/3 times of Ni in the atomic ratio of In and Ni. Thus, without forming the covering layers excessively thick, the In covering layer containing In not forming an alloy with Ni can remain with a thickness capable of sufficiently exhibiting the characteristics of In on the outermost surface of the metal material when the metal material is placed in a high-temperature environment.

Details of Embodiments of Present Disclosure

Hereinafter, an embodiment of the present disclosure are described in detail using the drawings. In this specification, a content (concentration) of each element is based on the number of atoms such as atom % unless otherwise specified. Further, it is assumed that an elemental metal contains unavoidable impurities. Unless otherwise specified, an alloy may be a solid solution or may constitute an intermetallic compound. An alloy mainly containing a certain metal indicates an alloy containing 50 atom % or more of that metal element in a composition.

<Metal Material>

A metal material according to the embodiment of the present disclosure is described below. A connection terminal according to the embodiment of the present disclosure to be described later can be formed using the metal material according to the embodiment of the present disclosure. Further, the metal material according to the embodiment of the present disclosure can be manufactured by a metal material manufacturing method according to the embodiment of the present disclosure.

(Summary of Constitution of Metal Material)

Figure 1B:
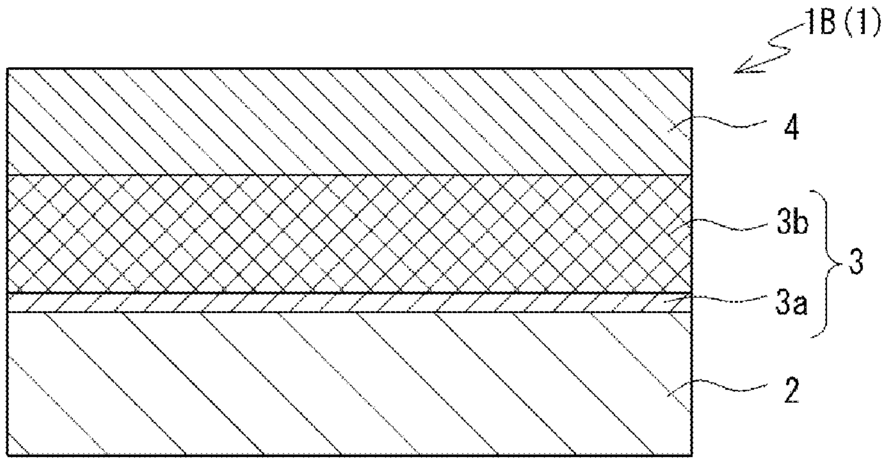
Figure 1C:
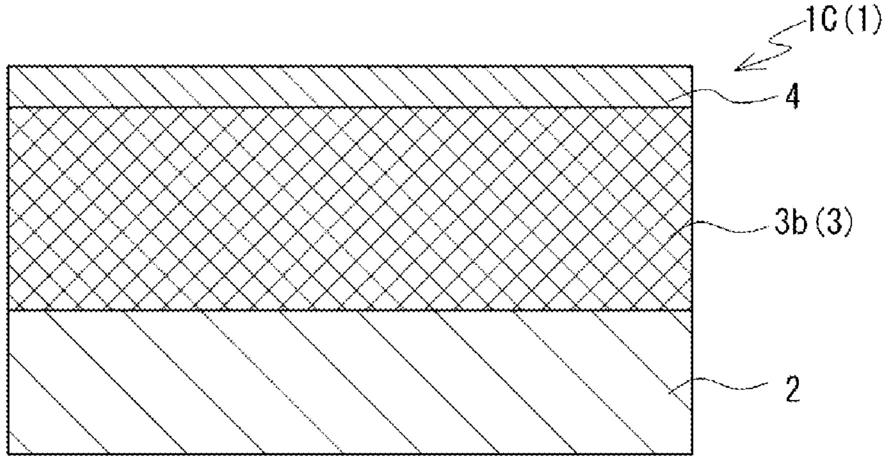

First, the metal material according to the embodiment of the present disclosure is summarized. A metal material 1 according to the embodiment of the present disclosure includes an intermediate layer 3 and an In covering layer 4 on a surface of a base material 2 as shown in FIGS. 1A to 1C showing structure examples to be described next. The intermediate layer 3 is provided to cover the surface of the base material 2, and the In covering layer 4 is provided to cover the intermediate layer 3 and exposed on an outermost surface.

The In covering layer 4 is made of In or In alloy not containing Ni other than as unavoidable impurities. Here, an In alloy not containing Ni other than as unavoidable impurities indicates an alloy containing metals other than In, but containing only an amount of Ni to be regarded as unavoidable impurities. In terms of strongly exhibiting characteristics of In in the In covering layer 4, the In covering layer 4 may be preferably made of In. Even if the In layer is made of In alloy, this alloy may be an alloy mainly containing In.

The intermediate layer 3 is a metal layer containing at least Ni. Specific constitution and component composition of the intermediate layer 3 are not particularly limited, but In is contained more than 7/3 times of Ni in an atomic ratio in the sum of the intermediate layer 3 and the In covering layer 4 ([In]/[Ni]>7/3). The intermediate layer 3 may not substantially contain In as in a first form mentioned next or may contain In in addition to Ni as in second and third forms. Further, the intermediate layer 3 may contain metal elements other than Ni and In, but preferably contains 50 atom % or more of Ni and In together. Particularly, the intermediate layer 3 is better not to contain metal elements, which possibly form an alloy with In, other than Ni. Further, it is preferred not to contain metal elements other than Ni and In except unavoidable impurities.

The intermediate layer 3 may be composed of only one layer or may have a laminated structure composed of two or more layers. Further, a plurality of phases may be spatially unevenly mixed in the intermediate layer 3. Three types of structures shown as the first, second and third forms below can be illustrated as preferred forms of the intermediate layer 3.

In the metal material 1, other metal layers may be respectively provided between the base material 2 and the intermediate layer 3, between a plurality of layers constituting the intermediate layer 3 and between the intermediate layer 3 and the In covering layer 4. However, in terms of the constitution of the metal material 1 and the simplicity of a manufacturing process, the base material 2 and the intermediate layer 3, the plurality of layers constituting the intermediate layer 3, and the intermediate layer 3 and the In covering layer 4 are respectively provided directly in contact without providing those other metal layers. A thin film (not shown) such as an organic layer may be provided on the surface of the In covering layer 4 unless characteristics of the In covering layer 4 are dramatically affected.

A material constituting the base material 2 is not particularly limited. Cu, Cu alloy, Al, Al alloy, Fe, Fe alloy and the like, which are often used as a constituent material of an electrical connection member, can be suitably used as the base material 2. Above all, Cu or Cu alloy excellent in processability and mechanical characteristics can be suitably used. A metal constituting the base material 2 and a metal constituting the intermediate layer 3 may form an alloy in an interface between the base material 2 and the intermediate layer 3.

(First Form)

FIG. 1A shows a layer configuration of a metal material 1A according to the first form. In this metal material 1A, an intermediate layer 3 has a single layer structure composed of a Ni covering layer 3*a*. That is, the Ni covering layer 3*a* is formed to directly cover a surface of a base material 2, and an In covering layer 4 is formed to directly cover the surface of the Ni covering layer 3*a*.

The Ni covering layer 3*a* is made of Ni or Ni alloy not containing In other than as unavoidable impurities. Here, the Ni alloy not containing In other than as unavoidable impurities indicates an alloy containing metals other than Ni, but containing only an amount of In to be regarded as unavoidable impurities. Preferably, the Ni covering layer 3*a* is made of Ni.

(Second Form)

FIG. 1B shows a layer configuration of a metal material 1B according to the second form. In this metal material 1B, an intermediate layer 3 has a double layer structure composed of a Ni covering layer 3*a* and an alloy layer 3*b*. That is, the Ni covering layer 3*a* is formed to directly cover a surface of a base material 2, and the alloy layer 3*b* is formed to directly cover a surface of the Ni covering layer 3*a*. Further, an In covering layer 4 is formed to cover a surface of the alloy layer 3*b*.

The Ni covering layer 3*a* has the same composition as the Ni covering layer 3*a* included in the metal material 1A according to the first form described above. The alloy layer 3*b* is made of alloy containing Ni and In. Preferably, the alloy layer 3*b* may be constituted as a layer mainly containing a Ni—In alloy and further a layer made of Ni—In alloy except unavoidable impurities.

The composition of the Ni—In alloy contained in the alloy layer 3*b* is not particularly limited. An intermetallic compound having a composition of $Ni_3In_7$ is easily formed as an alloy of Ni and In, and the alloy layer 3*b* in this embodiment preferably contains $Ni_3In_7$. Further, the Ni—In alloy contained in the intermediate layer 3 may mainly contain $Ni_3In_7$ and the entire Ni—In alloy contained in the alloy layer 3*b* is more preferably made of $Ni_3In_7$ except unavoidable components.

Ni and In are metals which easily form alloys and, particularly, more easily alloyed when being heated. Thus, when the metal material 1A according to the first form in which the Ni covering layer 3*a* and the In covering layer 4 are laminated is left in a high-temperature environment, alloying proceeds in an interface between the Ni covering layer 3*a* and the In covering layer 4 and the metal material 1B according to the second form is easily formed.

(Third Form)

FIG. 1C shows a layer configuration of a metal material 1C according to the third form. In this metal material 1C, an intermediate layer 3 has a single layer structure composed of an alloy layer 3*b*. That is, the alloy layer 3*b* is formed to directly cover a surface of a base material 2 and an In covering layer 4 is formed to directly cover a surface of the alloy layer 3*b*. This alloy layer 3*b* has the same composition as the alloy layer 3*b* included in the metal material 1B according to the second form described above.

If the metal material 1A according to the first form, in which the Ni covering layer 3*a* and the In covering layer 4 are laminated, is left in a high-temperature environment, Ni and In are respectively partially alloyed to form the metal material 1B according to the second form in which the alloy layer 3*b* is formed between the Ni covering layer 3*a* and the In covering layer 4. If that metal material 1B according to the second form is left in the high-temperature environment for a longer time, alloying further proceeds, all the Ni constituting the Ni covering layer 3*a* forms an alloy with In and the metal material 1C according to the third form is easily formed.

(Characteristics of Metal Material)

Including the metal materials 1A, 1B and 1C according to the first, second and third forms described above, the metal material 1 according to the embodiment of the present disclosure includes the In covering layer 4 on the outermost surface. Thus, characteristics of In can be exhibited on the outermost surface of the metal material 1. In is a very soft metal and has solid lubricity. Accordingly, the surface of the In covering layer 4 shows a low friction coefficient. Thus, when the metal material 1 according to the embodiment of the present disclosure is used as a constituent material of a member to be slid against another member such as a connection terminal, a force required for sliding can be suppressed to be small. In the case of a connection terminal, an insertion force required to insert and fit the connection terminal can be suppressed to be small. Further, In is a metal high in electrical conductivity, and an oxide film is easily destroyed, such as by the application of a load, even if In is oxidized on the outermost surface. Therefore, when the metal material 1 according to the embodiment of the present disclosure is used as a constituent material of an electrical connection member such as a connection terminal, a contact resistance can be suppressed to be small on the surface of the In covering layer 4 and high connection reliability can be obtained.

The Ni covering layer 3*a* made of Ni or Ni alloy and the alloy layer 3*b* made of alloy containing Ni and In function as diffusion suppressing layers by being interposed between the In covering layer 4 and the base material 2, and can suppress the diffusion of a metal constituting the base material 2 such as Cu into the In covering layer 4. Then, it can be suppressed that the metal constituting the base material 2 forms an alloy with In in the In covering layer 4 or is diffused to the outermost surface to form an oxide and reduce a contact resistance.

In the metal material 1 according to the embodiment of the present disclosure, In is contained more than 7/3 times, i.e. 2.33 times, of Ni in an atomic ratio in the sum of the intermediate layer 3 and the In covering layer 4. In is a metal which easily forms an alloy with Ni. Particularly, the formation of the alloy easily proceeds at a high temperature. Thus, when the metal material 1 is placed in a high-temperature environment, there is a possibility that In contained in the In covering layer 4 forms an alloy with Ni contained in the intermediate layer 3 as a lower layer. An intermetallic compound of $Ni_3In_7$ is easily formed as an alloy of In and Ni, and an amount of In to be alloyed with Ni in just proportions is 7/3 times as much as Ni in an atomic ratio. However, in the metal material 1 according to the embodiment of the present disclosure, since In atoms are contained more than 7/3 times of Ni atoms in the sum of the intermediate layer 3 and the In covering layer 4, even if all the Ni contained in the intermediate layer 3 forms an alloy with In constituting the In covering layer 4 and/or In contained in the intermediate layer 3 (alloy layer 3*b*) to form $Ni_3In_7$, excess In not alloyed with Ni remains as the In covering layer 4. That is, in the metal material 1 according to the embodiment of the present disclosure, even if the alloying of In and Ni proceeds after a high-temperature environment, the In covering layer 4 remains on the outermost surface.

As a result, the characteristics exhibited by In, i.e. characteristics such as a low friction coefficient and a low contact resistance and a low insertion force and high connection reliability at the time of a connection terminal, can be enjoyed also on the surface of the metal material 1 even after the metal material 1 is placed in the high-temperature environment. That is, the metal material 1 has a high heat resistance. If the In covering layer 4 does not remain on the outermost surface of the metal material and the alloy layer 3*b* is exposed after the high-temperature environment, the alloy containing Ni and In does not show excellent solid lubricity and low contact resistance like In due to its hardness and the like. Thus, the surface of the metal material becomes less suitable as an electrical connection member such as a connection terminal as compared to the surface of the metal material before being placed in the high-temperature environment.

Note that, besides $Ni_3In_7$, intermetallic compounds such as NiIn, $Ni_2In$ and $Ni_3In$ are known as alloys of In and Ni. However, among those intermetallic compounds, $Ni_3In_7$ is an intermetallic compound having a highest ratio of In to Ni. Thus, in the metal material 1, In atoms are contained more than 7/3 times of Ni atoms in the sum of the intermediate layer 3 and the In covering layer 4, whereby the In covering layer 4 can remain on the outermost surface of the metal material 1 after the high-temperature environment even if the intermetallic compound other than $Ni_3In_7$ is formed.

In terms of making the In covering layer 4 having a sufficient thickness easily remain after a high-temperature environment, the content of In is more preferably 2.4 times or more or 3.0 times or more of that of Ni in an atomic ratio in the sum of the intermediate layer 3 and the In covering layer 4. An upper limit of the content of In based on Ni is not particularly limited, but the content of In may be, for example, set to 4 times or less of that of Ni in an atomic ratio in the sum of the intermediate layer 3 and the In covering layer 4, such as in terms of not using an excess amount of In.

Particularly, since the Ni covering layer 3*a* and the In covering layer 4 are adjacently formed in the metal material 1A according to the first form, the alloying of Ni and In easily proceeds in the high-temperature environment. If the alloying of Ni and In proceeds to a certain extent, part of Ni constituting the Ni covering layer 3*a* forms a Ni—In alloy and the alloy layer 3*b* is formed between the Ni covering layer 3*a* and the In covering layer 4 as in the metal material 1B according to the second form. If the alloying further proceeds, all the Ni constituting the Ni covering layer 3*a* forms a Ni—In alloy to grow the alloy layer 3*b* as in the metal material 1C according to the third form. However, since the In atoms constituting the In covering layer 4 are more than 7/3 times of the Ni atoms constituting the Ni covering layer 3 in the metal material 1A according to the first form, the In covering layer 4 containing In not alloyed with Ni remains on the outermost surface as shown in FIGS. 1B and 1C as the metal materials 1B, 1C according to the second and third forms even after the alloying.

In the metal material 1B according to the second form, there is a possibility that the alloying of Ni and In proceeds in the high-temperature environment. In that case, all the Ni constituting the Ni covering layer 3 forms a Ni—In alloy and constitutes the alloy layer 3*b* as in the metal material 1C according to the third form. However, since the In atoms contained in the In covering layer 4 and the alloy layer 3*b* are more than 7/3 times of the Ni atoms constituting the Ni covering layer 3*a* and the alloy layer 3*b* in the metal material 1B according to the second form, the In covering layer 4 containing In not alloyed with Ni remains on the outermost surface as shown in FIG. 1C as the metal material 1C according to the third form even after the further alloying.

Since the intermediate layer 3 does not include the Ni covering layer 3*a* in the metal material 1C according to the third form, any further alloy formation does not basically proceed and the In covering layer 4 formed on the outermost surface is maintained as it is even after the high-temperature environment. Alternatively, even if an intermetallic compound having a low ratio of Ni to In such as NiIn, $Ni_2In$ or $Ni_3In$ is converted into an intermetallic compound having a high ratio of In such as $Ni_3In_7$ in the already formed alloy layer 3*b*, a state where the In covering layer 4 is present on the outermost surface is maintained.

When the metal materials 1B, 1C according to the second and third forms are formed as the alloying proceeds in the metal material 1A according to first form, the alloy layer 3*b* is not actively formed. However, in the metal material 1 according to the embodiment of the present disclosure, the alloy layer 3*b* made of alloy containing Ni and In may be actively formed as at least a part of the intermediate layer 3. Effects brought about by providing the intermediate layer 3 can include an enhanced effect of reducing the friction coefficient on the surface of the In covering layer 4 by the presence of the hard alloy layer 3*b* below the soft In covering layer 4.

If an atomic ratio at which In is more than 7/3 times of Ni is converted into a thickness ratio of an elemental In layer and an elemental Ni layer based on that a density of In is 7.31 $g/cm^3$ and that of Ni is 8.91 $g/cm^3$, the thickness of the In layer is 5.5 times as large as that of the Ni layer. Thus, if the thickness of the In covering layer 4 is set to more than 5.6 times, further 6.0 times or 7.0 times of that of the Ni covering layer 3*a* in the metal materials 1A, 1B according to the first and second forms in which the intermediate layer 3 includes the Ni covering layer 3*a*, the In covering layer 4 containing In not alloyed with Ni reliably and easily remain on the outermost surface of the metal materials 1A, 1B even after the high-temperature environment. Particularly, in the case of the metal material 1A according to the first form in which there is no alloying between the In covering layer 4 and the Ni covering layer 3*a*, the Ni covering layer 3*a* and the In covering layer 4 are adjacent and the alloying easily proceeds in a high-temperature environment. However, if the above thickness ratio is adopted, the In covering layer 4 can remain on the surface of the metal material 1A even after the alloying.

In the metal materials 1A, 1B according to the first and second forms, specific thicknesses of the In covering layer 4 and the Ni covering layer 3*a* are not particularly limited, but the thickness of the Ni covering layer 3*a* is preferably, for example, 0.5 μm or more in terms of enhancing an effect of forming the Ni covering layer 3*a* on the surface of the base material 2 to suppress the diffusion of the base material metal and the like. Even if the thickness of the Ni covering layer 3*a* is 1 μm or less, a high effect of suppressing the diffusion of the base material metal is exhibited. For example, a form in which the thickness of the Ni covering layer 3*a* is 1 μm or less and the thickness of the In covering layer 4 is 6 μm or more can be illustrated. If the thickness of the In covering layer 4 is 6 μm or more when the thickness of the Ni covering layer 3 is 1 μm or less, the characteristics of In can be effectively exhibited on the surfaces of the metal materials 1A, 1B. Particularly, it is preferred to adopt these thicknesses in the metal material 1A according to the first form in which there is no alloying between the In covering layer and the Ni covering layer 3*a*. Then, even if the metal material 1A is placed in a high-temperature environment and the alloying proceeds between In and Ni, the In covering layer 4 covering layer 3 having a thickness sufficient to effectively exhibit the characteristics of In easily remains on the outermost surface. An upper limit of the thickness of the In covering layer 4 is not particularly designated, but is preferably, for example, 10 μm or less, such as in terms of not making the In covering layer 4 excessively thick.

If the thickness of the Ni covering layer 3*a* of 1 μm or less and the thickness of the In covering layer 4 of 6 μm or more illustrated above are converted into contents of Ni and In per unit area in a region including the intermediate layer 3 and the In covering layer 4 together based on the above densities of Ni and In, the content of Ni is 0.89 mg/cm$^3$ or less and that of In is 4.3 mg/cm$^3$ or more. If the thicknesses of the intermediate layer 3 and the In covering layer 4 are set to satisfy these ranges in the metal materials 1A, 1B and 1C according to the first, second and third forms, the In covering layer 4 containing In not forming an alloy with Ni reliably and easily remains on the outermost surfaces of the metal materials 1A, 1B and 1C.

<Metal Material Manufacturing Method>

A method for manufacturing the metal material 1 according to the embodiment of the present disclosure is not particularly limited and a manufacturing method corresponding to a specific configuration of the intermediate layer 3 may be applied.

For example, the metal material 1A according to the first form can be manufactured by forming a Ni raw material layer and an In raw material layer in this order on the surface of the base material 2. The Ni raw material layer is a layer made of Ni or Ni alloy not containing In other than as unavoidable impurities, and directly becomes the Ni covering layer 3*a* in the manufactured metal material 1A. The In raw material layer is a layer made of In or In alloy not containing Ni other than as unavoidable impurities, and directly becomes the In covering layer 4 in the manufactured metal material 1A. Methods for forming the Ni raw material layer and the In raw material layer are not particularly limited, but plating methods can be suitably used.

In this manufacturing process, a thickness of the In raw material layer is set to be 5.6 times or more of that of the Ni raw material layer. Then, In used as a raw material is more than 7/3 times of Ni in an atomic ratio. Thus, the In covering layer 4 containing In not alloyed with Ni remains on the outermost surface even if the alloying proceeds between Ni and In when the manufactured metal material 1A according to the first form is placed in a high-temperature environment. Particularly, the thickness of the Ni raw material layer may be set to 1 μm or less, possibly 0.5 μm or more, and the thickness of the In raw material layer may be set to 6 μm or less.

The metal material 1B according to the second form is manufactured using the metal material 1A according to the first form as a raw material. That is, by placing the metal material 1A according to the first form in a high temperature environment of 150° C. or higher during storage or use, the alloying proceeds between Ni constituting the Ni covering layer 3*a* and In constituting the In covering layer 4 and the alloy layer 3*b* containing a Ni—In alloy is formed between the Ni covering layer 3*a* and the In covering layer 4. By forming this alloy layer 3*b*, the metal material 1B according to the second form is produced.

The metal material 1C according to the third form is manufactured using the metal material 1A according to the first form or the metal material 1B according to the second form as a raw material. As described above, by placing the metal material 1A according to the first form in a high temperature environment of 150° C. or higher during storage or use, the alloying of Ni and In proceeds and the metal material 1B according to the second form including the alloy layer 3*b* between the Ni covering layer 3*a* and the In covering layer 4 is produced. If this metal material 1B according to the second form is further left for a long period of time or left in a higher temperature environment, the alloying between Ni and In further proceeds and all the Ni constituting the Ni covering layer 3*a* is consumed for the alloying with In. As the alloying proceeds in this way, the alloy layer 3*b* grows, the Ni covering layer 3*a* disappears, and the metal material 1C according to the third form including the intermediate layer 3 composed only of the alloy layer 3*b* is produced.

As just described, the alloy layer 3*b* included in the metal materials 1B, 1C according to the second and third forms is not intentionally formed, but is formed as the alloying naturally proceeds in the interface between the Ni covering layer 3*a* and the In covering layer 4 in the metal material 1A according to the first form. However, the alloy layer 3*b* may be intentionally formed in consideration of the contribution of the presence of the hard alloy layer 3*b* to a reduction in the friction coefficient of the surface of the In covering layer 4 or in terms of avoiding a change of the state of the metal material 1 with time as the alloy is formed during the use of the metal material 1. For example, by intentionally heating the metal material 1A according to the first form formed as a raw material, the formation of the alloy layer 3*b* can be promoted and the metal material 1B according to the second form or the metal material 1C according to the third form can be manufactured. Alternatively, the alloy layer 3*b* may be separately formed on the surface of the Ni covering layer 3 such as by alloy plating and, thereafter, the In covering layer 4 may be formed.

<Connection Terminal>

Next, the connection terminal according to the embodiment of the present disclosure is described. The connection terminal according to this embodiment is configured to contain the metal material 1 according to the embodiment of the present disclosure described above, e.g. any one of the metal materials 1A, 1B and 1C according to the first, second and third forms. At least a region containing a contact point portion to be brought into electrical contact with a mating electrically conductive member may be made of the metal material 1 according to the embodiment of the present disclosure. The intermediate layer 3 and the In covering layer 4 are formed on the surface of the base material 2 at least in the contact point portion. If the intermediate layer 3 and the In covering layer 4 are formed in this lamination order at least in the contact point portion on the surface of the connection terminal, each of the intermediate layer 3 and the In covering layer 4 may cover the entire surface of the connection terminal or may cover only a partial region.

Figure 2:
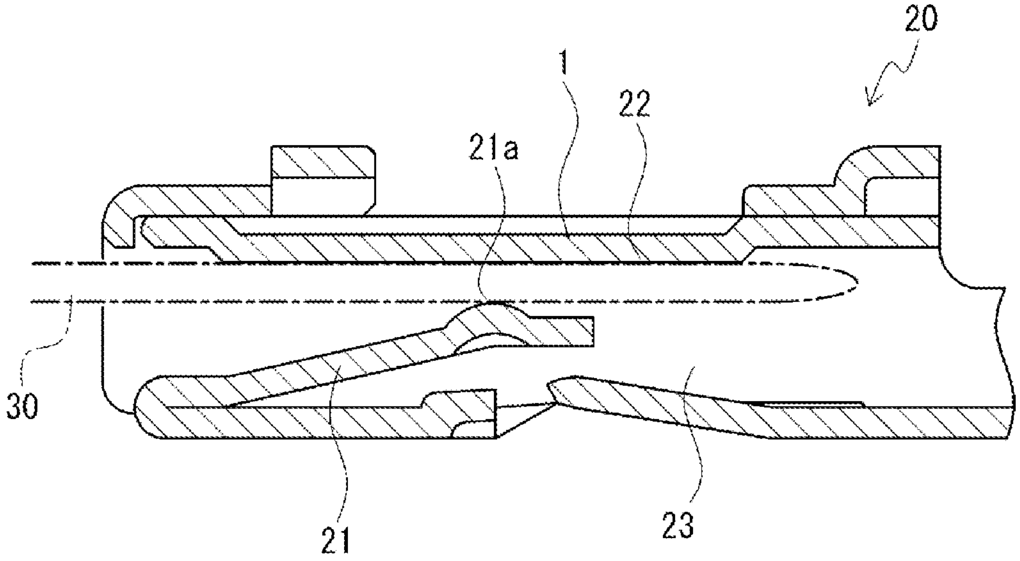
FIG. 2 is a section showing a connection terminal according to one embodiment of the present disclosure.

Specific type and shape of the connection terminal are not particularly limited. A female connector terminal 20 is shown as an example of the connection terminal according to one embodiment of the present disclosure in FIG. 2. The female connector terminal 20 is shaped similarly to known fitting-type female connector terminals. That is, a narrow pressure portion 23 is formed into a tubular shape open forward, and a resilient contact piece 21 shaped by being folded inwardly and rearwardly is provided at an inner side of the bottom surface of the narrow pressure portion 23. If a flat-plate type tab-shaped male connector terminal 30 is inserted as a mating electrically conductive member into the narrow pressure portion 23 of the female connector terminal 20, the resilient contact piece 21 of the female connector terminal 20 contacts the male connector terminal 30 at an embossed portion 21*a* bulging inwardly of the narrow pressure portion 23 to apply an upward force to the male connector terminal 30. A surface of a ceiling part of the narrow pressure portion 23 facing the resilient contact piece 21 serves as an inward facing contact surface 22. The male connector terminal 30 is pressed against the inward facing contact surface 22 by the resilient contact piece 21, thereby being pressed and held in the narrow pressure portion 23.

The female connector terminal 20 is entirely made of the metal material 1 including the intermediate layer 3 and the In covering layer 4 according to the above embodiment. Here, the surface of the metal material 1 formed with the intermediate layer 3 and the In covering layer 4 is facing inwardly of the narrow pressure portion 23 and is arranged to constitute mutually facing surfaces of the resilient contact piece 21 and the inward facing contact surface 22. The In covering layer 4 is exposed on those outermost surfaces. As a result, when the male connector terminal 30 is inserted into the narrow pressure portion 23 of the female connector terminal 20 and slid to establish an electrical connection, an effect of reducing an insertion force by the In covering layer 4 and high connection reliability are obtained in a contact part between the female connector terminal 20 and the male connector terminal 30. Further, even if the female connector terminal 20 is placed in a high-temperature environment, the In covering layer 4 remains on the outermost surface and these characteristics brought about by the In covering layer 4 are maintained.

Although the entire female connector terminal 20 is made of the metal material 1 including the intermediate layer 3 and the In covering layer 4 in the above form, the intermediate layer 3 and the In covering layer 4 may be formed in any range if these layers are formed at least on the surface of the contact point portion to be brought into contact with the mating electrically conductive member, i.e. formed on the surface of the embossed portion 21*a* of the resilient contact piece 21 and the inward facing contact surface 22. The connection terminal according to the embodiment of the present disclosure can have any one of various forms such as a press-fit terminal to be press-fit into a through hole formed in a printed board for connection besides the fitting-type female connector terminal or the male connector terminal as described above. Various connection terminals according to the embodiment of the present disclosure can be, for example, accommodated in a connector housing made of an insulating material, and used in the form of a connector. Further, that connector can be used in the form of a wiring harness by being connected to an end of a wire. Preferably, a multi-pole connector may be formed by accommodating a plurality of the connection terminals according to the embodiment of the present disclosure into a common connector housing.

The connection terminal according to the embodiment of the present disclosure can be suitably used in an environment in which temperature can get high such as the inside of an automotive vehicle. In recent years, the multipolarization of connectors proceeds in the field of automotive vehicles, and each of a multitude of connection terminals included in a connector is required to have a low insertion force in terms of suppressing an insertion force of the entire connector to be small. Further, there are many locations where temperature gets high in an automotive vehicle and the connection terminals are required to have a high heat resistance. Accordingly, a low insertion force and high connection reliability can be obtained by the contribution of the In covering layer 4, and the connection terminal according to the embodiment of the present disclosure capable of maintaining those characteristics of In even at high temperatures can be suitably used in an automotive vehicle.

EXAMPLES

Examples are described below. Note that the present invention is not limited by these examples. Here, a metal material according to the first form including a Ni covering layer and an In covering layer on a surface of a base material was fabricated and changes when the metal material was placed in a high-temperature environment were verified. Samples were fabricated and evaluated at a room temperature in the atmosphere below unless otherwise specified.

<Fabrication of Samples>

A Ni layer and an In layer were fabricated in this order on a surface of a copper alloy base material by electrolytic plating. A verification sample, in which a thickness of the Ni layer was 1 μm and that of the In layer was 1.5 μm, for verifying an alloying rate below was fabricated. Further, the following three samples were fabricated to be used for the identification of a crystal layer after heating below by making thicknesses of the Ni layer and the In layer different.

- Sample 1—the thickness of the Ni layer: 1.6 μm, the thickness of the In layer: 9.20 μm (atomic ratio [In]/[Ni]=3.30)
- Sample 2—the thickness of the Ni layer: 1.01 μm, the thickness of the In layer: 1.25 μm (atomic ratio [In]/[Ni]=0.519)
- Reference Sample—the thickness of the Ni layer: 1.0 μm, the thickness of the In layer: 0.5 μm (atomic ratio [In]/[Ni]=0.21)

<Evaluation Method>

(1) Alloying Rate

The verification sample fabricated above was thrown into a thermostatic bath of 150° C. After the elapse of a predetermined time, the verification sample was taken out from the thermostat bath and, after only the In layer was peeled off, a thickness of the In layer forming an alloy with Ni (thickness of the In layer consumed for alloy formation) was estimated by measuring a content of In in the alloy by a fluorescent X-ray film thickness meter. By changing a heating time in the thermostat bath, a relationship of the heating time and the thickness of the In layer forming the alloy was evaluated.

(2) Identification of Crystal Layer after Heating

Samples 1 and 2 fabricated above were heated for 210 hours in the thermostatic bath of 150° C. An X-ray diffraction (XRD) measurement was conducted for Samples 1 and 2 after heating and the reference sample not subjected to heating. The measurement was conducted by a θ-2θ method using a Cu-Kα ray as a ray source. An incident angle was 1° and a measurement range was 5 to 80°.

<Evaluation Results>

(1) Alloying Rate

Figure 3:
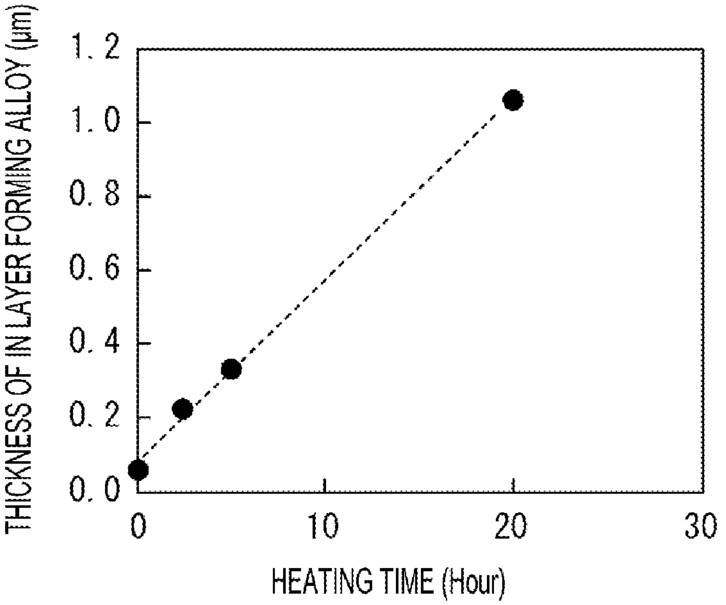
FIG. 3 is a graph showing a relationship of a heating time at 150° C. and a thickness of an In covering layer forming an alloy by heating for a metal material in which a Ni raw material layer and an In raw material layer are laminated.

FIG. 3 shows a relationship of the heating time at 150° C. (horizontal axis) and the thickness of the In layer forming the alloy (vertical axis). According to FIG. 3, as the heating time increases, the thickness of the In layer forming the alloy linearly increases. An approximation straight line is also shown in FIG. 3. This approximation straight line approximates data points well. From this, in a laminated structure of the Ni layer and the In layer, the alloying of Ni and In is understood to proceed at a rate, which can be regarded as constant. In an initial state (heating time of zero) where heating has not been performed yet, the thickness of the In layer forming the alloy is substantially zero and the alloying of Ni and In hardly occurs.

If t denotes the heating time and L m denotes the thickness of the In layer forming the alloy, the approximation straight line in FIG. 3 is expressed by an approximation formula of $L=0.0492t+0.0814$. In a test (2) whose result is described below, Samples 1 and 2 are heated at 150° C. for 210 hours. If t in the above approximation formula is substituted by this heating time of 210 hours, the thickness L of the In layer forming the alloy is 10.33 μm. It is confirmed that this thickness is larger than the thicknesses of the In layers of Samples 1 and 2 and the heating time of 210 hours is sufficiently long as a time, during which the alloying of all the Ni proceeds, in Samples 1 and 2.

(2) Identification of Crystal Layer after Heating

Figure 4:
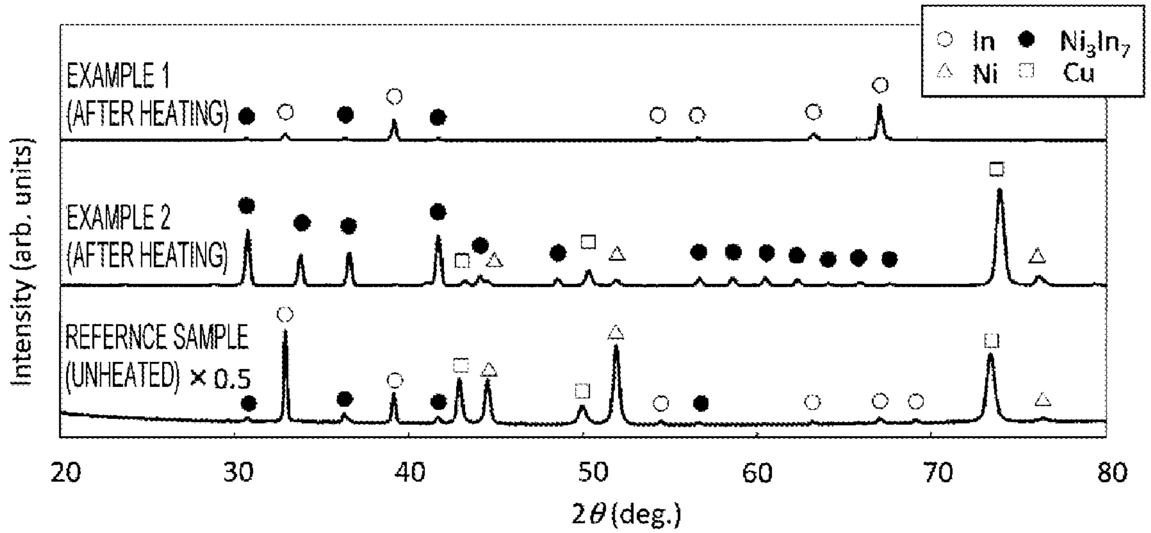
FIG. 4 is a graph showing measurement results of X-ray diffraction for the metal materials in which the Ni raw material layer and the In raw material layer are laminated, wherein an upper row shows a state after heating Sample 1 formed with a thick In raw material layer, a middle row shows a state after heating Sample 2 formed with a thin In raw material layer, and a lower row shows a state of an unheated reference sample.

FIG. 4 shows XRD measurement results obtained for Samples 1 and 2 in a state after heating at 150° C. for 210 hours and the reference sample kept at the room temperature without being heated. A horizontal axis represents 2θ (unit: degree) and a vertical axis represents a diffracted X-ray intensity (unit: arbitrary), an upper row corresponds to Sample 1 after heating, a middle row corresponds to Sample 2 after heating and a lower row corresponds to the unheated reference sample. Since Ni-derived peaks are stronger in the reference sample than in Samples 1 and 2 due to the thinner In layer, a scale of the vertical axis shown is 0.5-fold. In FIG. 4, peak positions corresponding to crystals of various metals are shown by symbols based on database information. A white circle (○) represents In, a black circle (•) represents $Ni_3In_7$, a triangle (Δ) represents Ni and a square (□) represents Cu.

In FIG. 4, the measurement result (lower row) of the unheated reference sample is first looked at. In the reference sample, large peaks of In and Ni appear with large intensities in addition to peaks of Cu of the base material. Peaks of $Ni_3In_7$ appear, but have small intensities as a whole as compared to the peaks of In and Ni. From this, only a small amount of the alloy was formed between Ni and In as also shown by data points at the heating time of zero of the above test (1) in the unheated laminated structure of the Ni layer and the In layer. It is confirmed that most of Ni laminated as the Ni layer is in an elemental Ni state, and most of In laminated as the In layer is in an elemental In state.

Next, the measurement result for Sample 2 after heating is looked at. In Sample 2 after heating (middle row), peaks (○) attributed to a crystal of elemental In are not observed. Peaks (Δ) attributed to a crystal of elemental Ni are observed, but the intensities thereof are small. On the other hand, peaks (•) attributed to $Ni_3In_7$ are observed with large intensities as a whole as compared to the peaks of Ni. From this result, it is thought that the alloying proceeded between the laminated In layer and Ni layer to form $Ni_3In_7$ and the elemental In layer disappeared in Sample 2. In Sample 2, an atomic ratio of In and Ni is [In]/[Ni]=0.529 and considerably smaller than an atomic ratio of 2.33 corresponding to the composition of $Ni_3In_7$ (In is less than Ni). Therefore, all the In having constituted the In layer is thought to have been alloyed with Ni to form $Ni_3In_7$.

On the other hand, in the measurement result of Sample 1 after heating (upper row), peaks (○) attributed to elemental In and peaks (•) attributed to $Ni_3In_7$ are observed. No peak (Δ) attributed to elemental Ni appears with intensities equal to or greater than a detection limit. This result shows that, in Sample 1, the alloying proceeded between the laminated In layer and Ni layer to form $Ni_3In_7$, but elemental In not consumed for alloy formation remained even after that alloying. Ni is thought to have been all consumed for the alloying. In Sample 1, an atomic ratio of In and Ni is [In]/[Ni]=3.30 and larger than the atomic ratio of 2.33 corresponding to the composition of $Ni_3In_7$ (In is more than Ni). Therefore, excess In not consumed for the alloying is interpreted to have remained on the sample surface in an elemental In state even after the alloying between In and Ni. In both Samples 1 and 2, a diffraction peak associated with the intermetallic compound of Ni and In having a composition other than $Ni_3In_7$ is not observed in an entire region of 2θ where the measurement was conducted, and the alloy of In and Ni can be said to be formed substantially as $Ni_3In_7$. Note that the peak intensities of $Ni_3In_7$ are smaller in Sample 1 than in Sample 2 because the In layer is present on the surface of $Ni_3In_7$ and an X-ray transmission intensity is attenuated by the In layer in Sample 1. No peak of Cu of the base material is observed in Sample 1 also because of the attenuation of the X-ray transmission intensity by the In layer and the $Ni_3In_7$ layer.

To summarize the XRD measurement results of Samples 1 and 2 after heating, the elemental In layer does not remain due to the alloying between In and Ni in Sample 2 in which the In layer is formed thinner than the Ni layer and the atomic ratio [In]/[Ni] is smaller than 7/3 (=2.33) corresponding to a composition ratio of $Ni_3In_7$. In contrast, the layer of the unalloyed elemental In remains on the sample surface even after the alloying between In and Ni in Sample 1 in which the In layer is formed thicker than the Ni layer and the atomic ratio [In]/[Ni] is larger than 7/3. From this, it is understood that the unalloyed In layer remains even after the alloying of Ni and In in a high-temperature environment by setting the atomic ratio [In]/[Ni] larger than 7/3 in the laminated structure of the Ni layer and the In layer.

Further, when a contact resistance on the surface was measured in each of states before and after heating for Sample 1, a contact resistance value when a contact load of 3 N was applied was about 0.8 mΩ in the state before heating and about 1 mΩ in the state after heating. That is, the contact resistance increases only a little even after heating and an absolute value is suppressed to be small. This is associated with the formation of the unalloyed In layer on the surface of Sample 1 after heating. Due to the remaining unalloyed In layer, a contact resistance reducing effect of In is thought to be maintained even after heating.

Although the embodiment of the present disclosure has been described in detail above, the present invention is not limited to the above embodiment at all and various changes can be made without departing from the gist of the present invention.

LIST OF REFERENCE NUMERALS

1 metal material
1A metal material according to first form
1B metal material according to second form
1C metal material according to third form
2 base material
3 intermediate layer
3*a* Ni covering layer
3*b* alloy layer
4 In covering layer
20 female connector terminal
21 resilient contact portion
21*a* embossed portion
22 inward facing contact surface
23 narrow pressure portion
30 male connector terminal

What is claimed is:

1. A metal material, comprising:
a base material;
an intermediate layer containing at least Ni, the intermediate layer covering a surface of the base material; and
an In covering layer made of In or In alloy not containing Ni other than as unavoidable impurities, the In covering layer covering a surface of the intermediate layer and being exposed on an outermost surface, In being contained more than 7/3 times of Ni in an atomic ratio in the sum of the intermediate layer and the In covering layer,
wherein
a content of Ni per unit area of the intermediate layer and the In covering layer together is 0.89 mg/cm$^2$ or less, and
a content of In per unit area of the intermediate layer and the In covering layer together is 4.3 mg/cm$^2$ or more.

2. The metal material of claim 1, comprising:
a Ni covering layer made of Ni or Ni alloy not containing In other than as unavoidable impurities; and
an alloy layer made of alloy containing Ni and In,
wherein:
the intermediate layer has any one of following first structure, second structure and third structure,
the intermediate layer being composed of the Ni covering layer in the first structure,
the intermediate layer being composed of the Ni covering layer and the alloy layer covering a surface of the Ni covering layer in the second structure, and
the intermediate layer being composed of the alloy layer in the third structure.

3. The metal material of claim 2, wherein:
the intermediate layer has the first structure or the second structure, and
a thickness of the In covering layer is 5.6 times or more of that of the Ni covering layer.

4. The metal material of claim 2, wherein:
the intermediate layer has the first structure or the second structure, and
a thickness of the Ni covering layer is 1 μm or less.

5. The metal material of claim 3, wherein the intermediate layer has the first structure.

6. The metal material of claim 2, wherein:
the intermediate layer has the second structure or the third structure, and
the alloy layer contains an intermetallic compound of $Ni_3In_7$.

7. The metal material of claim 1, wherein the base material is made of Cu or Cu alloy.

8. A connection terminal configured to contain the metal material of claim 1, the intermediate layer and the In covering layer being formed on the surface of the base material at least in a contact point portion to be brought into electrical contact with a mating electrically conductive member.

9. A metal material manufacturing method, comprising:
forming a Ni raw material layer made of Ni or Ni alloy not containing In other than as unavoidable impurities on a surface of a base material; and
forming an In raw material layer made of In or In alloy not containing Ni other than as unavoidable impurities to cover a surface of the Ni raw material layer, the In raw material layer being exposed on an outermost surface, a thickness of the In raw material layer being 5.6 times or more of that of the Ni raw material layer,
wherein
a content of Ni per unit area of the Ni raw material layer and the In raw material layer together is 0.89 mg/cm$^2$ or less, and
a content of In per unit area of the Ni raw material layer and the In raw material layer together is 4.3 mg/cm$^2$ or more.

10. The metal material manufacturing method of claim 9, wherein the thickness of the Ni raw material layer is 1 μm or less.

* * * * *